United States Patent
Emmelmann et al.

[19]

[11] Patent Number: 6,135,542
[45] Date of Patent: Oct. 24, 2000

[54] CAR BODY PART, PARTICULARLY A CONTOURED FRAME MEMBER

[75] Inventors: Hans-Joachim Emmelmann; Hans-Wolfgang Seeliger, both of Osnabrueck, Germany

[73] Assignee: Wilhelm Karmann GmbH, Osnabrueck, Germany

[21] Appl. No.: 08/972,180

[22] Filed: Nov. 18, 1997

[30] Foreign Application Priority Data

Nov. 21, 1996 [DE] Germany .............................. 196 48 164

[51] Int. Cl.$^7$ .................................................... B62D 29/00
[52] U.S. Cl. .................... 296/205; 296/187; 296/203.01; 428/36.5; 428/613
[58] Field of Search .................................... 296/205, 901, 296/187, 203.01, 203.03; 428/613, 36.5

[56] References Cited

U.S. PATENT DOCUMENTS

| | | | |
|---|---|---|---|
| 2,935,396 | 5/1960 | Pashak | 428/613 X |
| 2,974,034 | 3/1961 | Fiedler et al. | 428/613 X |
| 2,983,597 | 5/1961 | Elliott . | |
| 3,087,807 | 4/1963 | Allen et al. . | |
| 3,342,563 | 9/1967 | Butts | 428/613 X |
| 3,660,149 | 5/1972 | Kuesma et al. . | |
| 3,704,193 | 11/1972 | Valdo et al. | 156/196 |
| 3,834,881 | 9/1974 | Niebylski | 428/613 |
| 3,940,262 | 2/1976 | Niebylski et al. | 428/613 X |
| 4,989,913 | 2/1991 | Moore, III | 296/205 |
| 5,102,188 | 4/1992 | Yamane | 296/205 |
| 5,213,391 | 5/1993 | Takagi | 296/205 |
| 5,318,819 | 6/1994 | Pai | 296/205 |
| 5,344,208 | 9/1994 | Bien et al. | 296/187 |
| 5,575,526 | 11/1996 | Wycech | 296/205 |
| 5,642,914 | 7/1997 | Takabatake | 296/205 |
| 5,678,826 | 10/1997 | Miller | 296/187 |
| 5,755,486 | 5/1998 | Wycech | 296/205 |
| 5,806,915 | 9/1998 | Takabatake | 296/901 |
| 5,806,919 | 9/1998 | Davies | 296/205 |
| 5,888,600 | 3/1999 | Wycech | 428/613 X |

FOREIGN PATENT DOCUMENTS

| | | | |
|---|---|---|---|
| 195 46 352 | 6/1996 | Germany . | |
| 196 12 781 | 8/1997 | Germany . | |
| 404110280 | 4/1992 | Japan | 296/187 |
| 405319305 | 12/1993 | Japan | 296/205 |

*Primary Examiner*—Dennis H. Pedder
*Attorney, Agent, or Firm*—Jordan and Hamburg LLP

[57] ABSTRACT

A contoured frame member or other car body parts for car bodies of motor vehicles, particularly convertibles, for which the contoured frame member or the car body part bounds a cavity reinforced with a foamed metallic foam material, is formed in such a manner that a structural component is disposed in the interior of the cavity extending in the longitudinal direction of the latter, and in that the foamed metallic foam material occupies the space between the inner wall of the contoured frame member and the structural component lying therein. The internal cavity in the longitudinal direction, has partial regions filled with reinforcing parts of a metallic foam material and, between individual, reinforced regions, remaining hollow regions, the reinforcing parts being connected with the inner walls of the chassis part by way of metallic bonding. A method is also provided for reinforcing regions of car body parts, particularly of components of the type named above.

14 Claims, 7 Drawing Sheets

CAR BODY PART, PARTICULARLY A CONTOURED FRAME MEMBER

BACKGROUND OF THE INVENTION

The invention relates to a contoured frame member for bodies of motor vehicles as well as to a car body part and to a method.

The DE 195 46 352 A1 discloses contoured frame members for vehicle bodies, for which a cavity, bounded by the contoured frame member, is filled up with an aluminum foam material and thereby stiffened. For this purpose, either the aluminum foam material is poured as a melt into the cavity formed by the contoured frame member and foamed in this or the foaming process is carried out to begin with outside of the contoured frame member and a piece of suitable size is cut out of the block of foam material for use in the contoured frame member.

However, the foaming of a melt in the contoured frame member requires that this component, which must be closed off at least at one end for the pouring, has to be in a position suitable for this purpose. Filling an already installed contoured frame member or one, which has been preinstalled in a component, with aluminum foam in the running production process is not possible with this method.

Mounting premanufactured aluminum foam blocks, which form a solid body, in the contoured frame member requires first of all that these blocks be trimmed to fit accurately. Consequently, only simple shapes, such as square contours, come into consideration. In addition, moreover, the foam blocks must be fixed in the contoured frame member, which makes the installation more expensive and increases the weight.

SUMMARY OF THE INVENTION

As opposed to this, it is an object of the invention to construct contoured frame members or other car body parts, which border a cavity, in such a manner that, on the one hand, there is maximum flexibility during their manufacture and, on the other, the reinforcing elements have the ability to adapt to a broad spectrum of static and dynamic stresses, such as those encountered in the car-body region.

Due to the arrangement of a structural component in the interior of a contoured frame member and the filling up with foam of the space between the structural component and the contoured frame member, a component is formed, which can be used in the motor vehicle as a frame element or as a reinforcing element, for example, as a windshield frame or as a roll bar and particularly, however, as a bearing element of the basic structure, such as side barriers, where previously already pipes and the like, disposed in convertible construction in the contoured frame member, were indispensable for maintaining torsional rigidity. Previously, such inner structural components have been supported with respect to the outer contoured frame member by way of cross member-like integral moldings.

Filling the intermediate space with foam enables the inner structural component to be supported two-dimensionally, so that a uniform capability to resist deformations arising from outside, especially buckling deformations such as those occurring during an accident, is achieved.

At the same time, due to the use of a metallic foam material for filling up this intermediate space, the weight is lowered. Compared to previous components, the wall thickness of the internal structural component, particularly of the pipe, can be reduced.

A car body component, which contains, aside from the regions filled with metallic foam material, particularly with aluminum foam material, also cavities, which remain free, offers the possibility of reinforcing only those regions of the car body component, which are subject to special stresses. In the case of a windshield frame, for example, this could be the side bearing contours which have to absorb the vertical components of force in the event of overturning.

Such car body parts, partially filled with foam, can also find use, for example, in the area of lateral cavities in doors. In this case, the foaming is always adapted to the nature of the forces that are anticipated to be introduced. Owing to the fact that, aside from foam-filled regions of the cavity defined by the car body part, partial regions of the car body parts can remain free, the possibility is provided of reducing the weight appreciably. In so doing, the position and the arrangement of the component, which is to be filled with metallic foam material, do not have to fulfill any special requirements.

It becomes possible to prepare the foam material parts to such an extent, that they can be inserted into differently shaped car body parts and contoured frame members and foamed therein. It is therefore no longer necessary to limit the internal cross section of a contoured frame member. Likewise, the contoured frame member or car body part need not be in a vertical position and closed off at one end. Instead, the foam material parts can be introduced during the running production process without having to premanufacture the components which are to be filled with foam.

Further advantages and details arise out of the drawing, as well as from the following description of several examples of the object of the invention.

IN THE DRAWINGS

FIG. 1 shows a truncated side view of a motor vehicle body with an inventive contoured frame member in the barrier region, FIG. 2 shows a section along the line II—II of FIG. 1 and wherein a portion of the foam metallic material is shown prior to being foamed and a portion after being foamed.

FIG. 3 shows a truncated side view of a motor vehicle body with an inventive car body part as windshield frame, FIG. 4 shows a section along the line IV—IV of FIG. 3 and FIG. 5 shows a representation similar to that of FIG. 4, FIG. 6 shows a truncated, diagrammatic representation of a convertible with a roll bars, FIG. 7 shows a section along the line VII—VII of FIG. 6 and wherein a portion of the foam metallic material is shown prior to being foamed and a portion after being foamed, FIG. 8 shows a partial sectional view showing the foamable material before being foamed, and FIG. 9 shows a partial sectional view, similar to FIG. 8, but showing the foamable material after it has been foamed.

DESCRIPTION OF THE PREFERRED EMBODIMENTS

Figure 1:
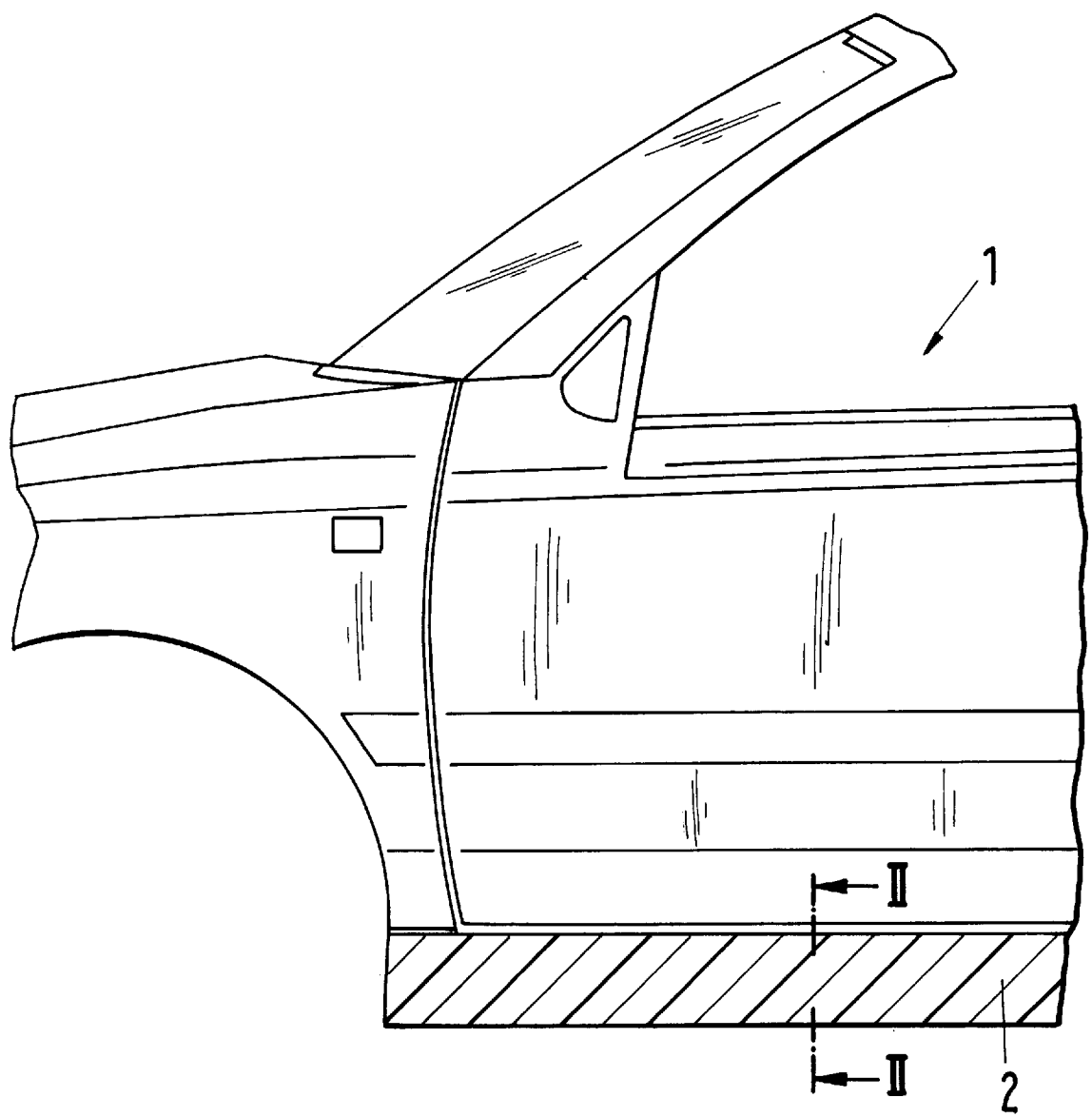
Figure 6:
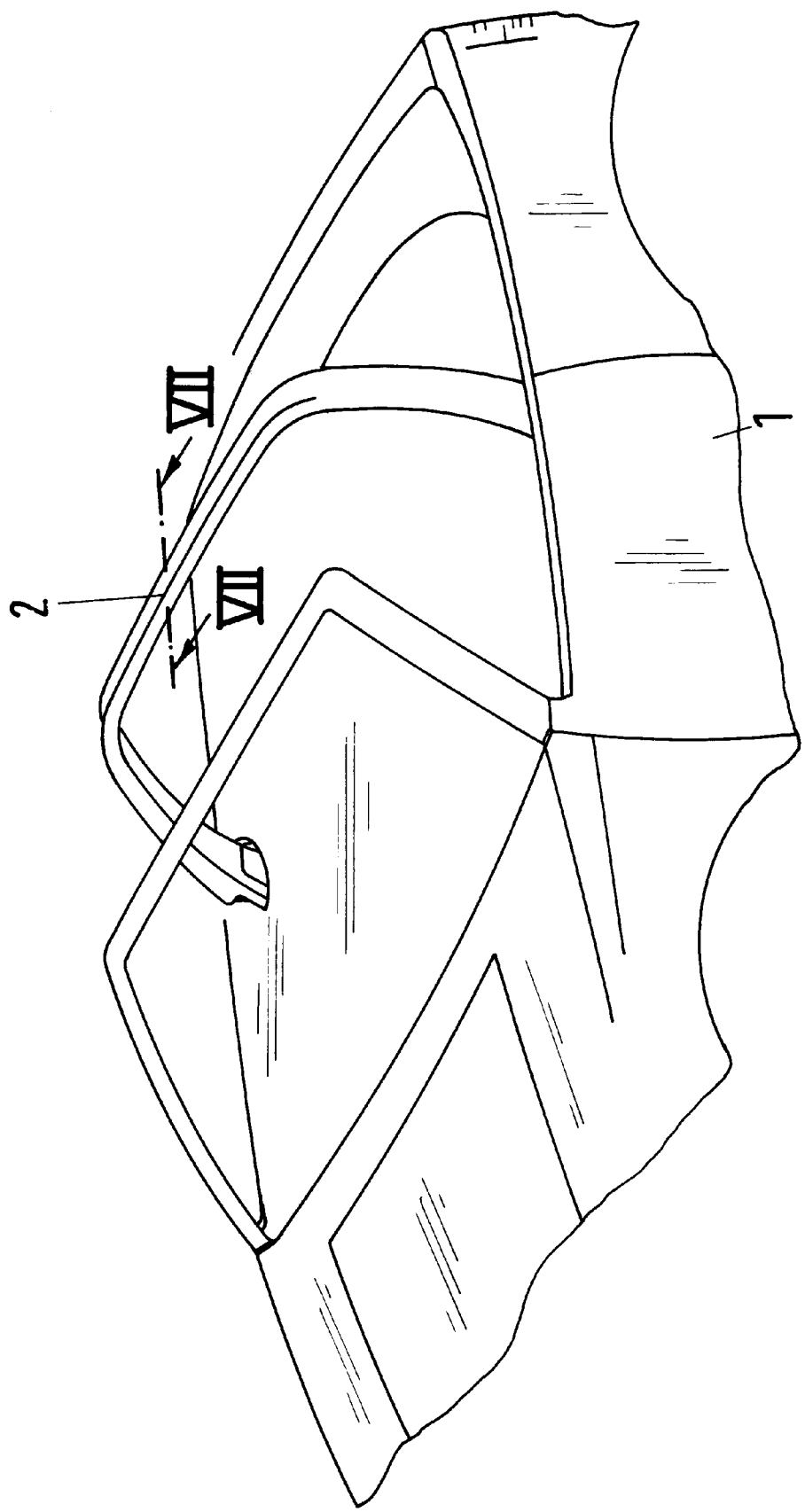

In detail, an inventive contoured frame member 2, which is part of the body 1 of a motor vehicle and forms, for example, a side barrier (FIGS. 1 and 2) or a windshield frame or roll bar (FIGS. 6 and 7), has an internal cavity 3, in which a bearing pipe 4 is disposed. This pipe 4 forms a structural component of the car body and extends in the longitudinal direction of the outer contoured frame member 2.

In the end state of the parts, the cavity 3 between the inner pipe 4 and the contoured frame member 2 surrounding it is occupied by a foamed metallic foam material 5. By these means, when a force is introduced laterally approximately in the direction of the arrow F, the contoured frame member 2 is supported over a large area with respect to the inner structural component 4, so that the forces arising can be distributed better than when the structural component 4 is connected in cross member fashion to the contoured frame member 2. Furthermore, buckling deformation of the component sets in only in response to considerably higher forces or not at all, if the force is the same. With that, the stiffness of the side barrier or other frame part, as well as the buckling stability of this part are increased clearly. At the same time, the ability of the component to resist forces introduced from any direction is increased due to the fact that the cavity 3 is filled uniformly with foam.

The inner structural component 4 can be constructed in different ways, for example, as a sheet of metal bent in the longitudinal direction, as a solid body or as a hollow profile, particularly as a pipe. In special cases, the inner structural component 4 may also be constructed as a tensional part, which holds different regions of a contoured frame member 2 together, for example, when the latter has kinks or folds.

On the one hand, a pipe 4, disposed in the side barrier, fulfills its function of reinforcing the side barrier and stabilizing it against buckling deformations and of increasing the torsional strength of the car body 1 as a whole. On the other, the inner hollow regions of the pipe 4 can also be used as a duct for leads and particularly as a cable duct.

Figure 3:
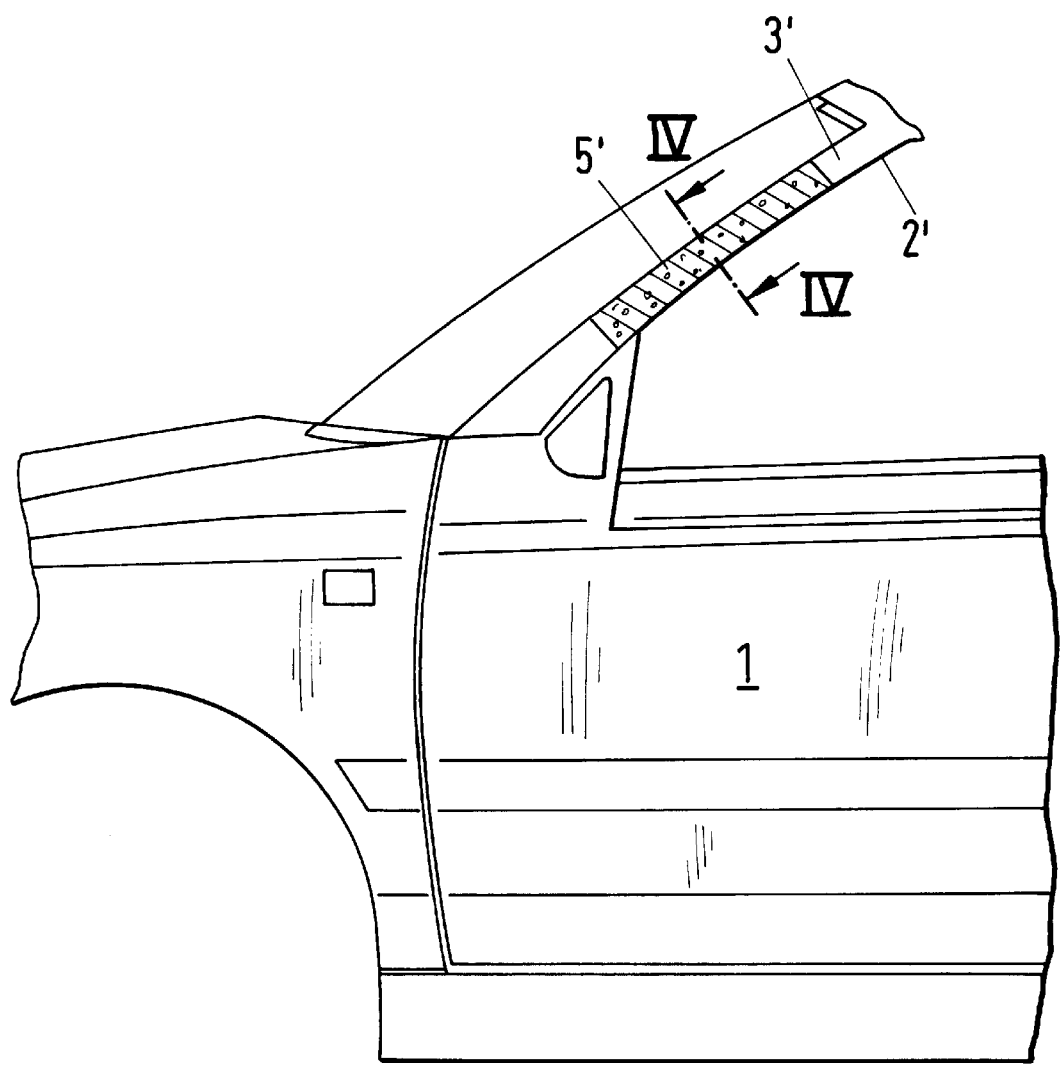
Figure 4:
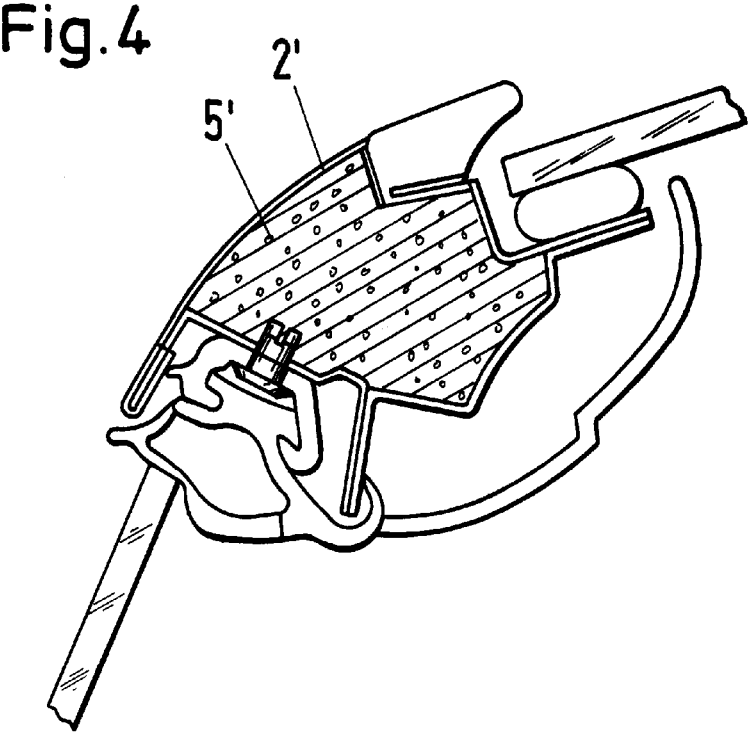
Figure 5:
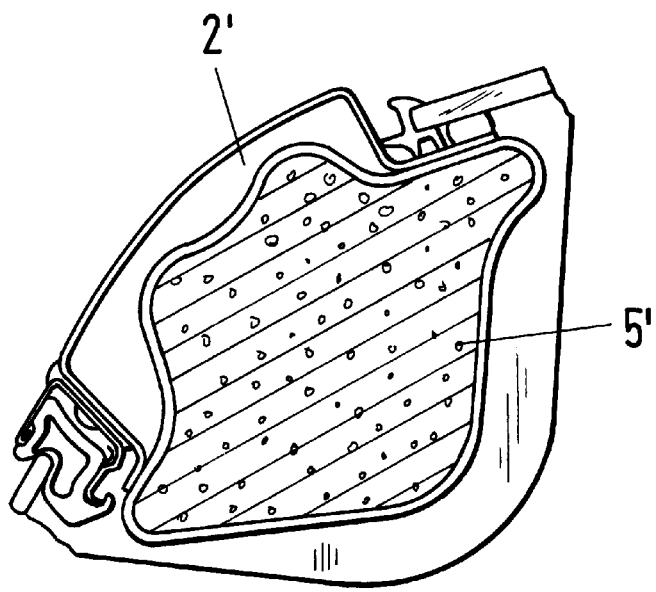

FIGS. 3 to 5 show the construction of a car body part 2', which is constructed as a windshield frame and therefore also as a contoured member. It forms an inner cavity 3', regions of which are filled with reinforcing parts 5' of a metallic foam material, particularly of aluminum foam.

Not only contoured frame members come into consideration for such a construction of car body parts 2'. Other areas of the car body, particularly cavities between an inner and an outer metal sheet, such as in doors or in the front regions of the engine hood, can also be filled with foam, in order to bring about a reinforcement of the car body 1 by these means in regions endangered by collisions, without having to fill a cavity 3' completely with foam and, as a result, increasing the weight of the car body 1 considerably.

The region 5', which is filled with foam, occupies only a portion of the cavity 3'. Significant hollow regions, for example, 20% of the cavity 3', remain between regions 5' filled with foam, so that, in all, only the parts of a car body part 2', such as a windshield frame or a roll bar, which are subjected to particularly high stresses when forces, such as those occurring during an accident, are introduced, are filled with a metallic foam material. In comparison to full foaming, the remaining hollow regions bring about a reduction in weight. When the car body part 2' is constructed as a windshield frame or as a roll bar, particularly the lateral cross ties are the parts, which are subjected to stresses due to the introduction of vertical forces, when a vehicle overturns.

Figure 2:
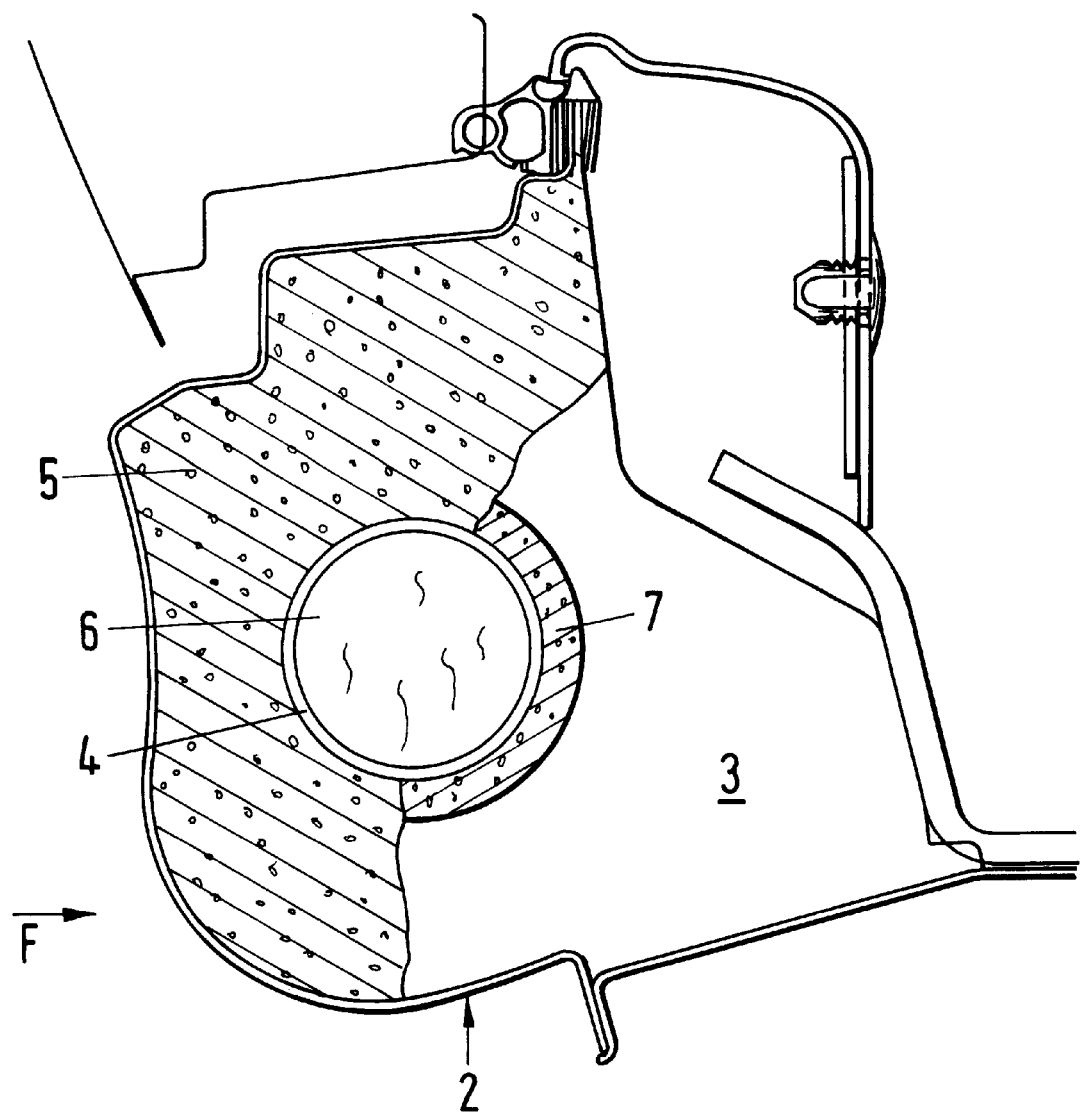
Figure 7:
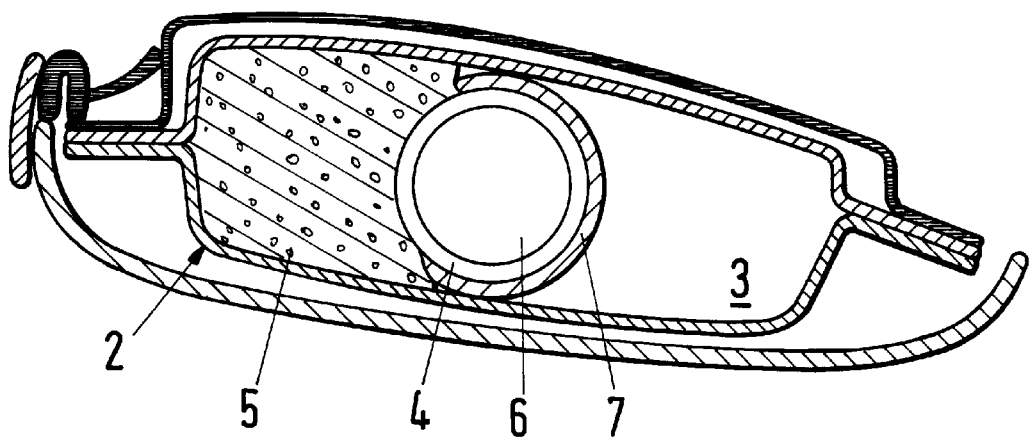

Such a car body part 2', which is reinforced regionally with metallic foam material, can also additionally have an internal structural component 4, so that a cross sectional representation, similar to that in FIGS. 2 and 7, results in those partial regions filled with foam. With this, on the one hand, the high stability reserve, arising out of the internal structural component 4, such as a pipe, can be utilized. On the other, the large-area support of a contoured frame member 2' at the pipe 4 can be limited to the regions, which have to absorb forces. It is therefore not necessary to limited to the regions, which have to absorb forces. It is therefore not necessary to fill all the space between the pipe 4 and the contoured frame member 2' with foam, thus saving weight. Such foaming in regions with an internal structural component 4 is advisable, for example, in doors, for which the filling of the space of large surface area between an inner and an outer region with foam would mean a large increase in weight.

To form the described components 2, 2' in the cavity 3 of the contoured frame member 2 or the car body part 2', semifinished products of a metallic foam material are used, the foaming of which to their final configuration is completed by heating in the contoured frame member 2 or in the car body part 2'.

At least the inner walls of the car body part 2, 2' form the boundary for the final configuration. The semi-finished product can be developed as a primitive body or adapted already to the shape of the cavity 3, 3', that is, preprocessed close to the final contour. The foaming of the semifinished product, so introduced, is completed within the car body part 2, 2' to the final configuration by the application there of heat.

This heating can be carried out in various ways, for example, by induction, radiation heat, heat conduction or convection and through the use of electromagnetic waves of the type used, for example, in laser technology. If an internal structural component 4 containing a cavity 6 is disposed in the contoured frame member 2 or in some other part 2' of the car body, a heated medium can also be passed through this cavity 6, as a result of which the space between the structural component 4 and the outer component 2, 2' is heated, so that foaming of the semifinished product, which has been introduced, is attained here.

Such an internal structural component 4 can be provided on its external side, facing the cavity 3, with a layer 7 of the metallic material, which is to be foamed. This layer 7 must not extend over the whole length of the structural component 4. Instead, it is possible in this manner to fill only regions of the cavity 3 between the contoured frame member 2 and the internal structural component 4 with foam cavities remaining therebetween. When this layer 7 is heated, the foaming agents contained in this foam material ensure that this layer is foamed, so that, as shown in the left part of FIG. 2, the whole of the cavity 3 between the contoured frame member 2 and the internal structural component 4 is filled in cross section with foamed foam material 5, the foam material 5 bonding with the surrounding car body part 2, 2' and the structural component 4. With that, it is possible to fill the cross section of any cavity with foam without being limited by the shape of the car body part. It is not necessary to premanufacture the semifinished product, which is to be introduced, so as to provide it with a contour that is close to the final contour.

Similarly, the inner wall of the contoured frame member 2 or of some other part 2' of the car body can be provided additionally or instead with a layer of the metallic material that is to be foamed. In this case, the foaming process of this material is then limited by the internal structural component.

Alternatively, it is also possible to introduce into the cavity 3 one or more individual bodies of the metallic foam material that is to be foamed. During the heating stage, these bodies fill the cavity 3 at least regionally to such an extent, that the foaming is limited by the inner wall of the car body part 2 or 2' and of the internal structural component 4.

Overall, this method opens up the possibility of reinforcing partial regions of a car body part 2, 2' in such a manner, that in these regions a high resistance to forces acting from the outside is made possible, while the weight of the total component is as low as possible. Moreover the stiffness of the component can be increased by an internal structural component 4, which is connected 2-dimensionally by the metallic foam material with the outer part 2, 2' of the car body and therefore counters a large range of force-introduction directions and introduction points by means of very high buckling and bending strengths.

Figure 8:
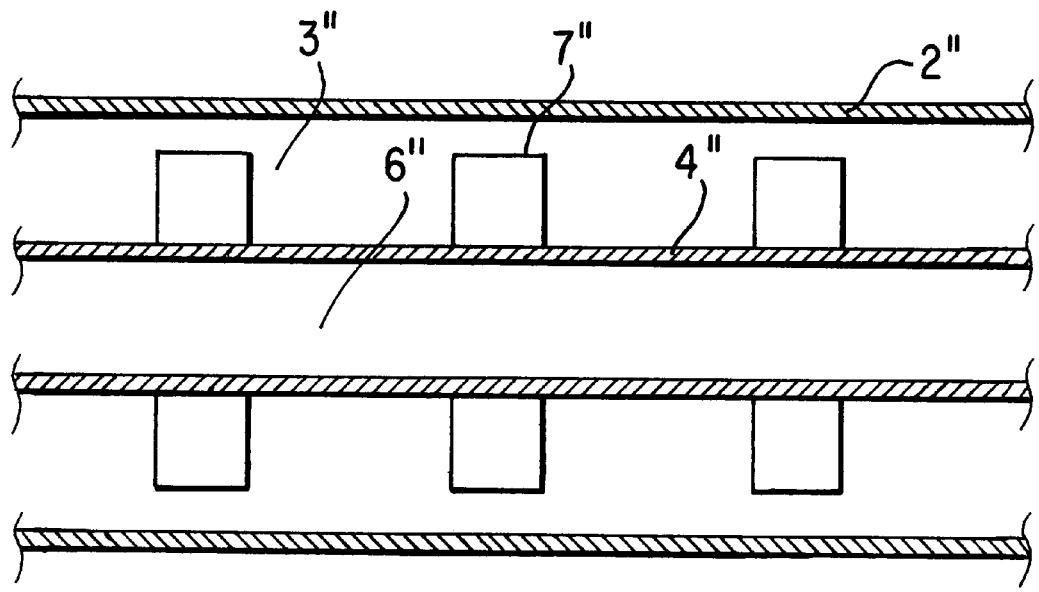
Figure 9:
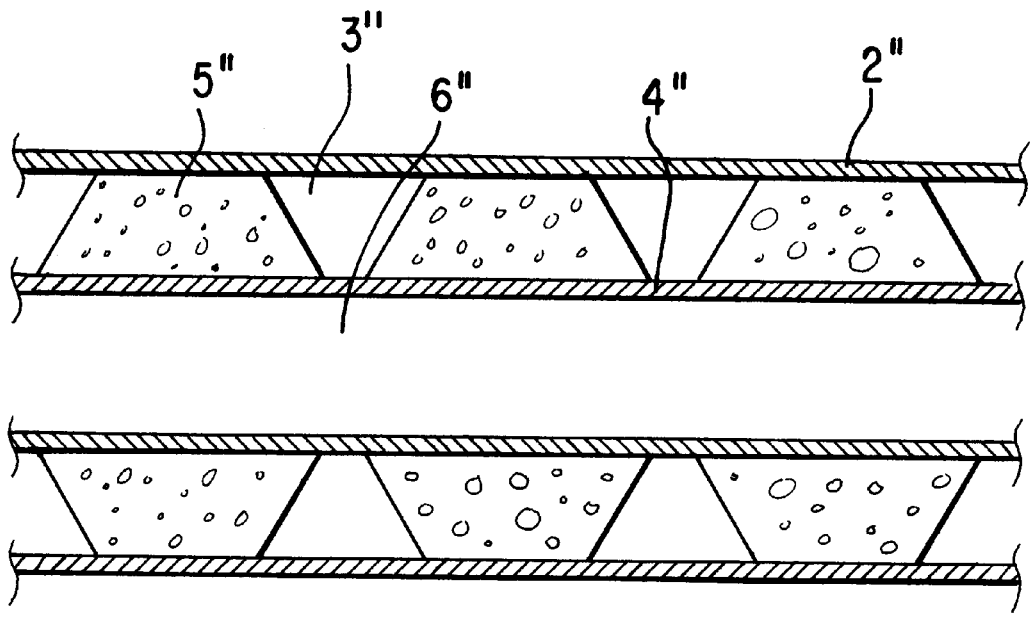

FIG. 8 shows, for example, a car body part 2" having an internal cavity 3" in which a structure component 4" is disposed. The foamable material disposed in the internal cavity 3 includes a plurality of spaced, preshaped foamable units 7" which have not yet been foamed. The foamable units 7" may be preformed and preshaped into different body configurations, for example, a square configuration as shown in FIG. 8. FIG. 9 shows the foamable material after having been foamed into the foamed reinforcing structures 5". FIG. 9 also shows the spaces 3" between the foamed reinforcing structures 5".

Foamable metallic materials are disclosed, for example, in German Patent DE 196 12 781 C1 and its U.S. counterpart U.S. Ser. No. 08/828,789 filed Mar. 27, 1997. The aforesaid German Patent DE 196 12 781 C1 and U.S. Ser. No. 08/828,789 are herein incorporated by reference.

Aside from the ability to adapt the reinforcing elements to the requirements of static and dynamic stresses on the car body parts, the installation is simplified at the same time in such a manner by the inventive method, so that different regions of the body of the vehicle can be reinforced flexibly during the installation process by internal foam materials.

What we claim is:

1. A structure for use in producing a frame unit for a motor vehicle comprising:

a contoured frame part having an inner wall forming a cavity having a cavity interior;

a structural component disposed in said cavity interior;

a solid metallic member disposed in said cavity interior on said structural component, said solid metallic member having an exposed surface exposed to said cavity interior;

said exposed surface being spaced from at least a portion of said inner wall of said cavity;

said solid metallic member comprising a foamable metallic material having the property of being foamable in situ in said cavity interior so as to expand outwardly from said exposed surface toward said inner wall of said cavity and to contact said inner wall at a contact area;

said solid metallic member of foamable metallic material further having the property to effect a bond with said inner wall of said cavity at said contact area.

2. A structure according to claim 1 wherein said solid metallic member is hollow.

3. A structure according to claim 1 wherein said solid metallic member is a hollow cylinder.

4. A structure according to claim 1 wherein said solid metallic member is a hollow cylinder having an inner cylindrical surface, said structural component having an outer cylindrical surface disposed on said inner cylindrical surface of said hollow cylinder, said hollow cylinder having an outer cylindrical surface which constitutes said exposed surface.

5. A structure according to claim 1 including a plurality of said solid metallic members disposed on said structural component.

6. A structure according to claim 1 wherein said solid metallic member has the property to expand outwardly from said exposed surface as said inner wall of said cavity provides a foaming mold.

7. A structure according to claim 1 wherein the foamed metallic material has the property to conform to the configuration of the inner wall of said cavity upon being foamed in situ.

8. A structure according to claim 1 wherein said structural component is a hollow cylinder.

9. A structure unit according to claim 1 wherein said solid metallic member comprises aluminum.

10. A structure unit according to claim 1 wherein said frame part is made of a metal material.

11. A structure for use in producing a frame unit for a motor vehicle comprising:

a frame Dart having an inner wall forming a cavity having a first cross sectional area;

a solid metallic member disposed in said cavity, said member having a second cross sectional area less than said first cross sectional area;

said solid metallic member comprising an in situ foamable material having the property of being foamed in situ in said cavity to expand so as to have a third cross sectional area substantially equal to said first cross sectional area;

said solid metallic member further having the property to effect contact with said inner wall of said cavity of said frame part at a contact area when said solid metallic member has expanded to have said third cross sectional area;

said solid metallic member further having the property to effect a bond with said inner wall of said cavity when said solid metallic member has expanded and contacted the contact area of said inner wall of said cavity;

said cavity being an elongate cavity having an elongate axis, said inner wall of said cavity having a first cross sectional configuration considered generally perpendicular to said elongate axis of said cavity;

an elongate structural component disposed in said cavity, said structural component having an elongate axis extending generally in the same direction as said elongate axis of said cavity, said structural component having an outer surface having a second cross sectional configuration considered generally perpendicular to said elongate axis of said component;

said first configuration having a contour different from the contour of said second configuration;

said first configuration enclosing a first enclosed area and said second configuration enclosing a second enclosed area, said first enclosed area being greater than said second enclosed area;

said solid metallic member in said cavity being disposed on said outer surface of said structural component.

12. A structure according to claim 11 wherein said solid metallic member is a hollow cylinder.

13. A structure according to claim 11 wherein said structural component is a hollow cylinder.

14. A generally cylindrical product of use in producing a frame unit for a motor vehicle in which the frame unit includes a contoured frame part having an inner wall forming a cavity and a structural component disposed in said cavity interior, the product comprising:

a solid metallic member having a generally hollow cylindrical configuration with an inner cylindrical wall and an outer cylindrical wall, said solid metallic member being disposable in said cavity and said inner cylindrical wall being disposable about said structural element;

said solid metallic member comprising a foamable metallic material having the property of being foamable in situ in said cavity interior so as to expand outwardly from said exposed surface toward said inner wall of said cavity and to contact said inner wall at a contact area;

said solid metallic member of foamable metallic material further having the property to effect a bond with said inner wall of said cavity at said contact area.

* * * * *

UNITED STATES PATENT AND TRADEMARK OFFICE
CERTIFICATE OF CORRECTION

PATENT NO. : 6,135,542
DATED : October 17, 2000
INVENTOR(S) : Hayno Rustige

Page 1 of 1

It is certified that error appears in the above-identified patent and that said Letters Patent is hereby corrected as shown below:

Drawings,
FIG. 2b, Sheet 6, replace "ani-als" with -- animals --.

Signed and Sealed this

Twelfth Day of March, 2002

Attest:

JAMES E. ROGAN
*Attesting Officer*  *Director of the United States Patent and Trademark Office*